United States Patent [19]
Abdallah et al.

[11] Patent Number: 6,035,318
[45] Date of Patent: Mar. 7, 2000

[54] BOOTH MULTIPLIER FOR HANDLING VARIABLE WIDTH OPERANDS

[75] Inventors: Mohammad Abdallah, Folsom; Scott Siers, Elk Grove, both of Calif.

[73] Assignee: Intel Corporation, Santa Clara, Calif.

[21] Appl. No.: 09/050,993

[22] Filed: Mar. 31, 1998

[51] Int. Cl.[7] ................................ G06F 7/52; G06F 7/38
[52] U.S. Cl. ........................................... 708/628; 708/518
[58] Field of Search .................................. 708/628–631, 708/625, 620, 518

*Primary Examiner*—Tan V. Mai
*Attorney, Agent, or Firm*—Antonelli, Terry, Stout & Kraus, LLP

[57] ABSTRACT

A circuit for generating partial products for variable width multiplication operations is provided. According to an embodiment of the present invention, the circuit includes a plurality of partial product selector groups, each partial product selector group includes a plurality of partial product selector circuits. Each partial product selector circuit receives a portion of a multiplicand as an input and outputs a partial product. The circuit also includes a plurality of Booth encoders. At least one of the Booth encoders is coupled to each partial product selector group. Each Booth encoder receives as an input a portion of a wide multiplier and outputs a Booth encoded value to at least a portion of a partial product selector group. The circuit further includes an override circuit coupled to one or more of the partial product selector circuits. The override circuit is operable to control one or more of the partial product selector circuits to output a zero to thereby avoid unwanted cross-products when performing multiple smaller multiplications using the same circuit.

19 Claims, 10 Drawing Sheets

FIG. 5

TWO 32-BIT SECTIONS

SECTION 1

$O_8O_7O_6O_5B_4B_3B_2B_1$ X $(a_{11})$ = PP1
$O_8O_7O_6O_5B_4B_3B_2B_1$ X $(a_{12})$ = PP2
$O_8O_7O_6O_5B_4B_3B_2B_1$ X $(a_{13})$ = PP3
$O_8O_7O_6O_5B_4B_3B_2B_1$ X $(a_{14})$ = PP4

$O_8O_7O_6O_5B_4B_3B_2B_1$ X $(a_{21})$ = PP5
$O_8O_7O_6O_5B_4B_3B_2B_1$ X $(a_{22})$ = PP6
$O_8O_7O_6O_5B_4B_3B_2B_1$ X $(a_{23})$ = PP7
$O_8O_7O_6O_5B_4B_3B_2B_1$ X $(a_{24})$ = PP8

$O_8O_7O_6O_5B_4B_3B_2B_1$ X $(a_{31})$ = PP9
$O_8O_7O_6O_5B_4B_3B_2B_1$ X $(a_{32})$ = PP10
$O_8O_7O_6O_5B_4B_3B_2B_1$ X $(a_{33})$ = PP11
$O_8O_7O_6O_5B_4B_3B_2B_1$ X $(a_{34})$ = PP12

$O_8O_7O_6O_5B_4B_3B_2B_1$ X $(a_{41})$ = PP13
$O_8O_7O_6O_5B_4B_3B_2B_1$ X $(a_{42})$ = PP14
$O_8O_7O_6O_5B_4B_3B_2B_1$ X $(a_{43})$ = PP15
$O_8O_7O_6O_5B_4B_3B_2B_1$ X $(a_{44})$ = PP16

SECTION 2

FOUR 16-BIT SECTIONS

SECTION 1
$0_8 0_7 0_6 0_5 0_4 0_3 B_2 B_1$    X $(a_{11})$ = PP1
$0_8 0_7 0_6 0_5 0_4 0_3 B_2 B_1$    X $(a_{12})$ = PP2
$0_8 0_7 0_6 0_5 0_4 0_3 B_2 B_1$    X $(a_{13})$ = PP3
$0_8 0_7 0_6 0_5 0_4 0_3 B_2 B_1$    X $(a_{14})$ = PP4

$0_8 0_7 0_6 0_5 0_4 0_3 B_2 B_1$    X $(a_{21})$ = PP5
$0_8 0_7 0_6 0_5 0_4 0_3 B_2 B_1$    X $(a_{22})$ = PP6
$0_8 0_7 0_6 0_5 0_4 0_3 B_2 B_1$    X $(a_{23})$ = PP7
$0_8 0_7 0_6 0_5 0_4 0_3 B_2 B_1$    X $(a_{24})$ = PP8

SECTION 2
$0_8 0_7 0_6 0_5 B_4 B_3 0_2 0_1$    X $(a_{31})$ = PP9
$0_8 0_7 0_6 0_5 B_4 B_3 0_2 0_1$    X $(a_{32})$ = PP10
$0_8 0_7 0_6 0_5 B_4 B_3 0_2 0_1$    X $(a_{33})$ = PP11
$0_8 0_7 0_6 0_5 B_4 B_3 0_2 0_1$    X $(a_{34})$ = PP12

$0_8 0_7 0_6 0_5 B_4 B_3 0_2 0_1$    X $(a_{41})$ = PP13
$0_8 0_7 0_6 0_5 B_4 B_3 0_2 0_1$    X $(a_{42})$ = PP14
$0_8 0_7 0_6 0_5 B_4 B_3 0_2 0_1$    X $(a_{43})$ = PP15
$0_8 0_7 0_6 0_5 B_4 B_3 0_2 0_1$    X $(a_{44})$ = PP16

SECTION 3
$0_8 0_7 B_6 B_5 0_4 0_3 0_2 0_1$    X $(a_{51})$ = PP17
$0_8 0_7 B_6 B_5 0_4 0_3 0_2 0_1$    X $(a_{52})$ = PP18
$0_8 0_7 B_6 B_5 0_4 0_3 0_2 0_1$    X $(a_{53})$ = PP19
$0_8 0_7 B_6 B_5 0_4 0_3 0_2 0_1$    X $(a_{54})$ = PP20

$0_8 0_7 B_6 B_5 0_4 0_3 0_2 0_1$    X $(a_{61})$ = PP21
$0_8 0_7 B_6 B_5 0_4 0_3 0_2 0_1$    X $(a_{62})$ = PP22
$0_8 0_7 B_6 B_5 0_4 0_3 0_2 0_1$    X $(a_{63})$ = PP23
$0_8 0_7 B_6 B_5 0_4 0_3 0_2 0_1$    X $(a_{64})$ = PP24

SECTION 4
$B_8 B_7 0_6 0_5 0_4 0_3 0_2 0_1$    X $(a_{71})$ = PP25
$B_8 B_7 0_6 0_5 0_4 0_3 0_2 0_1$    X $(a_{72})$ = PP26
$B_8 B_7 0_6 0_5 0_4 0_3 0_2 0_1$    X $(a_{73})$ = PP27
$B_8 B_7 0_6 0_5 0_4 0_3 0_2 0_1$    X $(a_{74})$ = PP28

1) FOUR 16-BIT MULTIPLICATIONS (A=MULTIPLIER, B=MULTIPLICAND)

LEFT BOOTH                                                                       RIGHT BOOTH
SECTION 1
$PP_{2-1}$ $(a_{51})$                                     $0_8 0_7 B_6 B_5 0_4 0_3 B_2 B_1$    $(a_{11}) = PP_{1-1}$
$PP_{2-2}$ $(a_{52})$                                     $0_8 0_7 B_6 B_5 0_4 0_3 B_2 B_1$    $(a_{12}) = PP_{1-2}$
$PP_{2-3}$ $(a_{53})$                                     $0_8 0_7 B_6 B_5 0_4 0_3 B_2 B_1$    $(a_{13}) = PP_{1-3}$
$PP_{2-4}$ $(a_{54})$                                     $0_8 0_7 B_6 B_5 0_4 0_3 B_2 B_1$    $(a_{14}) = PP_{1-4}$ $PP_{2-5}$ $(a_{61})$                            $0_8 0_7 B_6 B_5 0_4 0_3 B_2 B_1$    $(a_{21}) = PP_{1-5}$
$PP_{2-6}$ $(a_{62})$                            $0_8 0_7 B_6 B_5 0_4 0_3 B_2 B_1$    $(a_{22}) = PP_{1-6}$
$PP_{2-7}$ $(a_{63})$                            $0_8 0_7 B_6 B_5 0_4 0_3 B_2 B_1$    $(a_{23}) = PP_{1-7}$
$PP_{2-8}$ $(a_{64})$                            $0_8 0_7 B_6 B_5 0_4 0_3 B_2 B_1$    $(a_{24}) = PP_{1-8}$

SECTION 2
$PP_{4-1}$ $(a_{71})$                     $B_8 B_7 0_6 0_5 B_4 B_3 0_2 0_1$    $(a_{31}) = PP_{3-1}$
$PP_{4-2}$ $(a_{72})$                     $B_8 B_7 0_6 0_5 B_4 B_3 0_2 0_1$    $(a_{32}) = PP_{3-2}$
$PP_{4-3}$ $(a_{73})$                     $B_8 B_7 0_6 0_5 B_4 B_3 0_2 0_1$    $(a_{33}) = PP_{3-3}$
$PP_{4-4}$ $(a_{74})$                     $B_8 B_7 0_6 0_5 B_4 B_3 0_2 0_1$    $(a_{34}) = PP_{3-4}$ $PP_{4-5}$ $(a_{81})$        $B_8 B_7 0_6 0_5 B_4 B_3 0_2 0_1$    $(a_{41}) = PP_{3-5}$
$PP_{4-6}$ $(a_{82})$        $B_8 B_7 0_6 0_5 B_4 B_3 0_2 0_1$    $(a_{42}) = PP_{3-6}$
$PP_{4-7}$ $(a_{83})$        $B_8 B_7 0_6 0_5 B_4 B_3 0_2 0_1$    $(a_{43}) = PP_{3-7}$
$PP_{4-8}$ $(a_{84})$        $B_8 B_7 0_6 0_5 B_4 B_3 0_2 0_1$    $(a_{44}) = PP_{3-8}$

2) FOUR 16-BIT MULTIPLICATIONS (C=MULTIPLIER, D=MULTIPLICAND)

LEFT BOOTH                                                                       RIGHT BOOTH
SECTION 3
$PP_{6-1}$ $(c_{51})$                                     $0_8 0_7 D_6 D_5 0_4 0_3 D_2 D_1$    $(c_{11}) = PP_{5-1}$
$PP_{6-2}$ $(c_{52})$                                     $0_8 0_7 D_6 D_5 0_4 0_3 D_2 D_1$    $(c_{12}) = PP_{5-2}$
$PP_{6-3}$ $(c_{53})$                                     $0_8 0_7 D_6 D_5 0_4 0_3 D_2 D_1$    $(c_{13}) = PP_{5-3}$
$PP_{6-4}$ $(c_{54})$                                     $0_8 0_7 D_6 D_5 0_4 0_3 D_2 D_1$    $(c_{14}) = PP_{5-4}$ $PP_{6-5}$ $(c_{61})$                            $0_8 0_7 D_6 D_5 0_4 0_3 D_2 D_1$    $(c_{21}) = PP_{5-5}$
$PP_{6-6}$ $(c_{62})$                            $0_8 0_7 D_6 D_5 0_4 0_3 D_2 D_1$    $(c_{22}) = PP_{5-6}$
$PP_{6-7}$ $(c_{63})$                            $0_8 0_7 D_6 D_5 0_4 0_3 D_2 D_1$    $(c_{23}) = PP_{5-7}$
$PP_{6-8}$ $(c_{64})$                            $0_8 0_7 D_6 D_5 0_4 0_3 D_2 D_1$    $(c_{24}) = PP_{5-8}$

SECTION 4
$PP_{8-1}$ $(c_{71})$                     $D_8 D_7 0_6 0_5 D_4 D_3 0_2 0_1$    $(c_{31}) = PP_{7-1}$
$PP_{8-2}$ $(c_{72})$                     $D_8 D_7 0_6 0_5 D_4 D_3 0_2 0_1$    $(c_{32}) = PP_{7-2}$
$PP_{8-3}$ $(c_{73})$                     $D_8 D_7 0_6 0_5 D_4 D_3 0_2 0_1$    $(c_{33}) = PP_{7-3}$
$PP_{8-4}$ $(c_{74})$                     $D_8 D_7 0_6 0_5 D_4 D_3 0_2 0_1$    $(c_{34}) = PP_{7-4}$ $PP_{8-5}$ $(c_{81})$        $D_8 D_7 0_6 0_5 D_4 D_3 0_2 0_1$    $(c_{41}) = PP_{7-5}$
$PP_{8-6}$ $(c_{82})$        $D_8 D_7 0_6 0_5 D_4 D_3 0_2 0_1$    $(c_{42}) = PP_{7-6}$
$PP_{8-7}$ $(c_{83})$        $D_8 D_7 0_6 0_5 D_4 D_3 0_2 0_1$    $(c_{43}) = PP_{7-7}$
$PP_{8-8}$ $(c_{84})$        $D_8 D_7 0_6 0_5 D_4 D_3 0_2 0_1$    $(c_{44}) = PP_{7-8}$

BOOTH MULTIPLIER FOR HANDLING VARIABLE WIDTH OPERANDS

BACKGROUND OF THE INVENTION

A widely used scheme for twos-complement multiplication uses Booth's algorithm which allows n-bit multiplication to be done using fewer than n additions or subtractions, thereby allowing faster multiplication. FIG. 1 illustrates an example of a traditional approach to multiplication using Booth's algorithm. The multiplication circuit of FIG. 1 performs one 64-bit multiplication. The multiplication circuit of FIG. 1 is implemented as a radix-4 Booth multiplication scheme (as an example). The multiplication circuit 10 of FIG. 1 includes a Booth encoding circuit 12 for encoding the 64-bit multiplier. A partial product selector circuit 14 is coupled to the Booth encoding circuit 12 and includes 32 partial product selector multiplexers for selecting one of several multiples (0, 1, 2, etc.) of the multiplicand. Each of the 32 partial product selector mux's outputs one of the 64-bit partial products (a multiple of the multiplicand) based on the signals from the Booth encode cells. The 32 partial products are added together using a Wallace Tree 16 followed by a carry look-ahead adder (CLA) 18. The Wallace tree is a tree-like network of carry save adders (CSAs). FIG. 2 illustrates one Booth encoder 22 and one partial product selector (mux) 24 for multiplication circuit 10 of FIG. 1. In this example, there are 32 Booth encoders 22 and 32 mux's 24. For radix-4 Booth encoding, the Booth encoder 22 Booth encodes two bits aij (plus an extra adjacent bit) of the multiplier (A) to generate a Booth encoded value 23 that is input to the mux 24. The Booth encoded value 23 identifies a multiple, such as 1, −1, 2, −2 or 0. Based on the Booth encoded value 23, mux 24 selects the corresponding multiple of the multiplicand (B) as the partial product.

Therefore, multiplication circuit 10 of FIG. 1 multiplies a 64-bit multiplicand (Gg) and a 64-bit multiplier (Hh) (where each of g, G, h and H represents a 32-bit quantity). This multiplication operation generates the following partial products:

$$\begin{array}{r} Gg \\ \underline{Hh}* \\ gh \\ hG \\ Hg \\ \underline{HG} \end{array}$$

However, instead of performing a single 64-bit multiplication, it may be desirable to perform two separate 32-bit multiplications in parallel using the same 64-bit multiplication circuit 10 of FIG. 1, as follows: g*h, and G*H. The products of the two multiplications should be (gh) and (GH). However, as shown above, the multiplication circuit of FIG. 1 will generate two unwanted cross products (hG) and (Hg) when attempting to perform two separate multiplication operations at the same time using the 64-bit multiplication circuit 10 of FIG. 1. The problem becomes worse when using the same 64-bit multiplication circuit 10 to perform four 16-bit multiplications or eight 8-bit multiplications.

As a result, using the 64-bit multiplication circuit 10 to perform two 32-bit multiplications requires performing each operation separately (i.e., two passes through the multiplication circuit), and four 16-bit multiplications will require four separate operations (i.e., four passes through the multiplication circuit). Thus, using the 64-bit multiplication circuit 10 to perform multiplication operations on operands smaller than 64-bits is slow and very inefficient. Therefore, a need exists for a single size multiplication circuit that can more efficiently handle operands of variable width.

SUMMARY OF THE INVENTION

According to an embodiment of the present invention, a circuit for generating partial products for variable width multiplication operations is provided. The circuit includes a plurality of partial product selector groups, each partial product selector group includes a plurality of partial product selector circuits. Each partial product selector circuit receives a portion of a multiplicand as an input and outputs a partial product. The circuit also includes a plurality of Booth encoders. At least one of the Booth encoders is coupled to each partial product selector group. Each Booth encoder receives as an input a portion of a wide multiplier and outputs a Booth encoded value to at least a portion of a partial product selector group. The circuit further includes a control circuit coupled to one or more of the partial product selector circuits. The control circuit is operable to control one or more of the partial product selector circuits to output a zero depending on a mode of operation.

BRIEF DESCRIPTION OF THE DRAWINGS

FIG. 5 illustrates a partial product tree for the multiplication circuit of FIG. 3 while operating in 32-bit mode.

FIG. 7 illustrates a partial product tree for the multiplication circuit of FIG. 6 while operating in 16-bit mode.

FIG. 9 illustrates a partial product tree for the multiplication circuit illustrated in FIG. 8 while operating in 16-bit mode

DETAILED DESCRIPTION OF THE INVENTION

Figure 3:
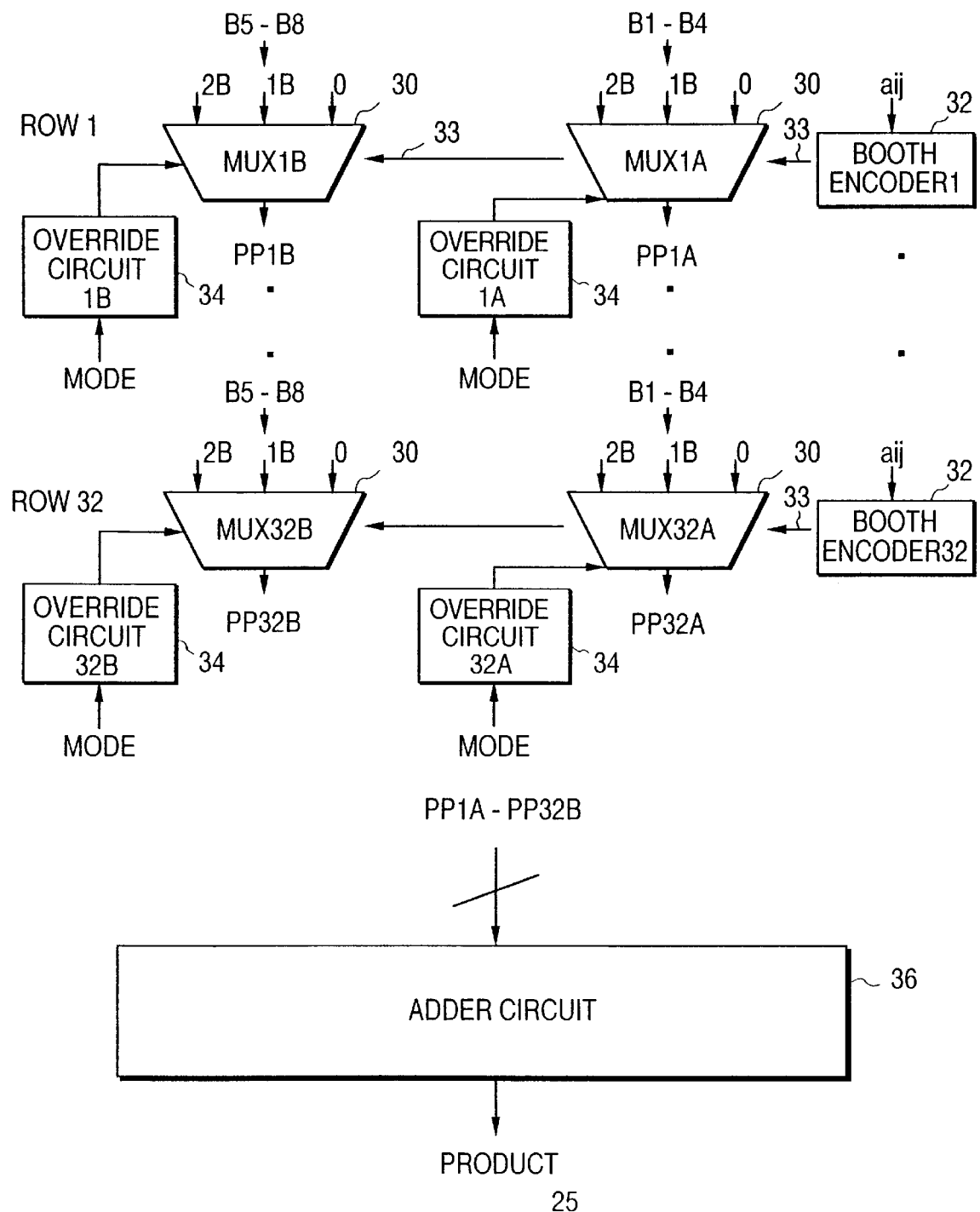
FIG. 3 is a block diagram of a multiplication circuit according to an embodiment of the present invention.

Referring to the figures in which like numerals indicate like elements, FIG. 3 is a block diagram of a multiplication circuit 25 according to an embodiment of the present invention. According to an embodiment of the present invention, multiplication circuit 25 is a 64-bit multiplication circuit (i.e., can handle a multiplicand and a multiplier up to 64 bits each), where the multiplier is Booth encoded. If multiplication circuit 25 is implemented using a radix-4 Booth encoding scheme, then a 64 bit multiplier will be Booth encoded to generate 32 Booth encoded values. However, a multiplier having a size of 64-bits and using a radix-4 scheme is provided merely as an example to explain the present invention. It is well understood that other size multipliers and other radix schemes can be used.

Multiplication circuit 25 can advantageously perform either a single 64-bit multiplication (64-bit mode) or two 32-bit multiplications in parallel (32-bit mode). The multiplication circuit 25 includes Booth encoders 32 for Booth encoding the multiplier, partial product selectors or mux's 30 for selecting an appropriate multiple of the multiplicand and an adder circuit 36 for adding the partial products output from mux's 30. Adder circuit 36 can include a Wallace tree and one or more carry look ahead adders, or other conventional adding circuits. Multiplication circuit 25 also advantageously includes override circuits 34 for forcing one or more partial products output from certain mux's 30 to zero to allow multiplication circuit 25 to efficiently multiply variable length operands without generating unwanted cross-products.

According to an embodiment of the present invention, in 64-bit mode, multiplication circuit 25 can multiply two 64-bit operands A and B, which have the following format:

$A_8 A_7 A_6 A_5 A_4 A_3 A_2 A_1$ (8 byte multiplier)

$B_8 B_7 B_6 B_5 B_4 B_3 B_2 B_1$ (8 byte multiplicand)

Each byte of A consists of four 2-bit quantities $a_{ij}$. Each of these 2-bit quantities $a_{ij}$ are fed with an extra bit from an adjacent two-bit quantity to be Booth encoded to identify the correct multiple of the multiplicand B.

Multiplication circuit 25 includes Booth encoders 32, including Booth encoder 1, Booth encoder 2, . . . Booth encoder 32. Each Booth encoder 32 Booth encodes one of the 2-bit quantities $a_{ij}$ to generate a Booth encoded value 33. Each Booth encoded value indicates a multiple of the multiplicand B (e.g., 1, −1, 2, −2, 0) for the corresponding partial product.

Referring to FIG. 3, there are 32 partial product selector rows (rows 1–32). Each row outputs 64-bits (8 bytes) of partial product(s). To allow multiplication circuit 25 to perform either a single 64-bit multiplication or two 32-bit multiplications, each partial product selector row is partitioned into two partial product selectors or mux's 30 (an A side mux and a B side mux). This provides a total of 64 partial product selectors or mux's 30, including mux's 1A, 1B, 2A, 2B . . . 32A, 32B.

Each mux 30 receives a Booth encoded value over line 33 from a Booth encoder 32.

Each mux 30 also receives a 1B input. The 1B input is 32-bits (4 bytes) of the 8 byte value B times 1. The other inputs to each mux (e.g., 2B, −1B, −2B, 0) can be easily calculated from the value 1B. Each mux 30 can receive a sign input (positive or negative), identifying whether the positive or negative input should be selected (e.g., 1B or −1B, 2B or −2B). For the A-side mux's, the 1B input is bytes $B_1$–$B_4$, while the 1B input for the B-side mux's is $B_5$–$B_8$. Each mux 30 selects an appropriate multiple of its 1B input (32-bits of the 64-bit value B) to be output as a partial product. In row 1 for example, as shown in FIG. 3, mux1A selects an appropriate multiple (1, −1, 2, −2, 0) of the least significant half of the multiplicand B (bytes $B_1$–$B_4$) based on the Booth encoded value received over line 33 to generate partial product 1A (PP1A), and mux1B selects an appropriate multiple of the other half (bytes $B_5$–$B_8$) of multiplicand B based on the same Booth encoded value to generate PP1B. When performing a 32-bit multiplication (i.e., 32-bit mode), partial products PP1A and PP1B are separate 32-bit partial products. When performing a single 64-bit multiplication (i.e., 64-bit mode), bytes $B_1$–$B_8$ represent a 64-bit multiplicand and PP1A (32 bits) and PP1B (32 bits) are concatenated to obtain a 64-bit partial product (PP1). Each of the other mux's 30 operate in a similar manner to generate 32 bits of a 64-bit partial product when operating in 64-bit mode.

Figure 4:
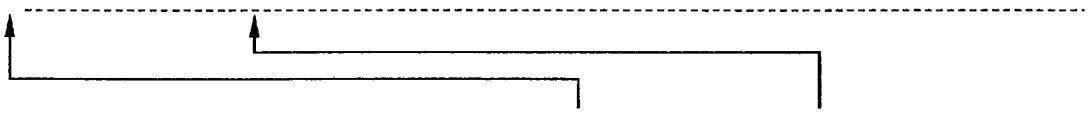
FIG. 4 illustrates a partial product tree for the multiplication circuit of FIG. 3.

FIG. 4 illustrates a partial product tree for the multiplication circuit 25 of FIG. 3. Each partial product (PP1, PP2, . . . PP32) is generated as an appropriate multiple of the multiplicand B based on the Booth encoded value. The Booth encoded values are indicated in FIG. 4 as ($a_{ij}$), where the parentheses indicates that the 2-bit quantity $a_{ij}$ has been Booth encoded. Each partial product is generated as the product of the multiplicand B (shifted by the appropriate number of bits) and the Booth encoded value ($a_{ij}$) output from the corresponding Booth encoder 32.

Those skilled in the art will appreciate that the multiplicand ($B_1$–$B_8$) for each of partial products 17–32 (PP17–PP32) are actually shifted to the left of PP16 (are given more weight than PP16). The size limitations of the paper did not permit the bytes ($B_1$–$B_8$) for rows 17–32 to be diagonally aligned properly in the partial product tree of FIG. 4. For example, although not indicated in FIG. 4, the B bytes for PP17 are actually shifted to the left of the B bytes for PP16. (This also applies to the additional partial product trees described below).

According to an embodiment of the present invention, multiplication circuit 25 can perform a single 64-bit multiplication (64-bit mode) or can perform two separate 32-bit multiplications in parallel (32-bit mode). Each override circuit 34 receives a mode input that indicates whether the multiplication circuit 25 is operating in 64-bit mode or 32-bit mode. Based on the mode input signal, each override circuit 34 outputs an override control signal (e.g., 0 or 1) to the mux 30 indicating whether or not the mux 30 should operate normally to output a multiple (1, −1, 2, −1, 0) of the input value 1B (the multiplicand) identified by the Booth encoded value, or whether the mux 30 should select the 0 input and ignore the Booth encoded value. In other words, each override circuit 34 outputs an override control signal that instructs the mux 30 to operate normally or instructs (e.g., overrides) the mux to output a zero regardless of the Booth encoded value for that row. Thus, when the output of the override circuit 34 is high, this instructs or controls the mux 30 to output a partial product of zero. By controlling selected mux's 30 to output a partial product of zero, the 64-bit multiplication circuit 25 can perform two 32-bit multiplications at the same time. Forcing selected partial products to zero eliminates unwanted cross products when performing two 32-bit multiplications in parallel In 64-bit mode, all override circuits 34 output a low to indicate that each mux 30 should operate normally to select a multiple (0, 1, 2, etc.) of the multiplicand 33.

FIG. 5 illustrates a partial product tree for the multiplication circuit 25 of FIG. 3 while operating in 32-bit mode. The 32 partial products are separated into two sections, section 1 and section 2. Section 1 generates partial products for a first 32-bit multiplication, while section 2 generates the partial products for the second 32-bit multiplication.

While the multiplicand bytes $B_8 B_7 B_6 B_5 B_4 B_3 B_2 B_1$ represent a 64-bit multiplicand in 64-bit mode, the multiplicand bytes $B_1$–$B_4$ represent a multiplicand for the first multiplication, and the multiplicand bytes $B_5$–$B_8$ represent a multiplicand for the second multiplication in 32-bit mode. As with the 64-bit mode, multiplicand bytes $B_1$–$B_4$ are provided as the 1B input to each of the A-side mux's (mux1A, mux2A, . . . mux32A), while multiplicand bytes $B_5$–$B_8$ are provided as the 1B input to each of the B-side mux's (mux1B, mux2B, . . . mux32B), while in the 32-bit mode.

Similarly, multiplier bytes $A_8 A_7 A_6 A_5 A_4 A_3 A_2 A_1$ represent a 64-bit multiplier in 64-bit mode. While in 32-bit mode, multiplier bytes $A_1$–$A_4$ represent a 32-bit multiplier for the first multiplication and multiplier bytes $A_5$–$A_8$ represent a 32-bit multiplier for the second multiplication. The Booth encoded values for the first multiplication (corresponding to multiplier bytes $A_1$–$A_4$) are indicated in FIG. 5 as ($a_{11}$–$a_{44}$), and the Booth encoded values for the second multiplication (corresponding to multiplier bytes $A_5$–$A_8$) are indicated in FIG. 5 as ($a_{51}$–$a_{84}$).

While in 32-bit mode, the B side mux's for rows 1–16 (mux1B, mux 2B, . . . mux 16B) are controlled by respective override circuits 34 to output (or select) a zero and thereby ignore the Booth encoded values. The 1B input into each of the B side mux's is multiplicand bytes $B_5$–$B_8$. This is represented in the partial product tree of FIG. 5 as forcing the multiplicand bytes $B_5$–$B_8$ to zero for PP1–PP16. Thus, in 32-bit mode, partial products for the first multiplication (PP1–PP16) are each generated as the product of the appropriately shifted multiplicand for the first multiplication ($B_1$–$B_4$) and a corresponding Booth encoded value [e.g., ($a_{11}$), ($a_{12}$), . . . ($a_{44}$)] for each A side mux. In other words, PP1–P16 are equal to PP1A–PP16A, respectively because PP1B–PP16B are zero (zeroed out by B side override circuits 34). Partial products PP1–PP16 are then added together to generate the product for the first multiplication.

Similarly, while in 32-bit mode, A side mux's for rows 17–32 (mux17A, mux 18A, . . . mux 32A) are controlled by respective override circuits 34 to output (or select) a zero for the partial product. The 1B input into each of the A side mux's is multiplicand bytes $B_1$–$B_4$. This is represented in the partial product tree of FIG. 5 as forcing the multiplicand bytes $B_1$–$B_4$ to zero for PP17–PP32. Thus, in 32-bit mode, partial products for the second multiplication (PP17–PP32) are each generated as the product of the appropriately shifted multiplicand for the second multiplication ($B_5$–$B_8$) and a corresponding Booth encoded value [e.g., ($a_{51}$), ($a_{52)}$, . . . ($a_{84}$)] for each B side mux. In other words, in 32-bit mode, partial products PP17–PP32 are equal to PP17B–PP32B, respectively, because PP17A–PP32A are zero (zeroed out by A side override circuits 34). Partial products PP17–PP32 are then added together to generate the product for the second multiplication.

Therefore, when the multiplication circuit 25 of FIG. 3 operates in 32-bit mode, unwanted cross-products are eliminated by forcing the partial product outputs of B side mux's for rows 1–16 to zero, and by forcing the partial product outputs of the A side mux's for rows 17–32 to zero. This allows two independent 32-bit multiplications to be performed in parallel using a 64-bit multiplication circuit having only one set of Booth encoders 32 without generating any erroneous or unwanted cross-products. According to an embodiment of the present invention, this is made possible by partitioning the mux for each 64-bit partial product into an A side mux and a B side mux. The 32 least significant bits ($B_1$–$B_4$) of the multiplicand B are provided as the 1B input (multiple of 1 times the multiplicand) to each of the A side mux's, and the 32 most significant bits ($B_1$–$B_8$) of the multiplicand B are provided as the 1B input to each of the B side mux's. Each mux 30 either operates normally to output an appropriate partial product based on the Booth encoded value (e.g., when the override signal is low) or each mux 30 is controlled by an override circuit 34 to output a zero (to eliminate erroneous or unwanted cross-products). In 64-bit mode, all mux's operate normally to output an appropriate partial product based on the Booth encoded value because there are no unwanted cross-products generated in 64-bit mode (a single multiplication). In 64-bit mode, 64-bit partial products are generated by concatenating a 32-bit partial product from an A-side mux and a 32-bit partial product from the B-side mux in the same row.

Each override circuit 34 receives a mode input identifying the mode of operation as either 64-bit or 32-bit. If the mode is 64-bit, all override circuits 34 output a low that instructs each mux 30 to operate normally. If the mode input indicates 32-bit mode, some of override circuits 34 will output a low (instructing normal mux operation), while other override circuits 34 will output a high to force the corresponding mux 30 to output a zero (and thereby eliminate erroneous cross-products), based on which partial product row (e.g., row 1, row 2, row 32) and which side (A side or B side) the mux is located, as described above. For example, while multiplication circuit 25 illustrated in FIG. 3 is in 32-bit mode, B side override circuits 34 for rows 1–16 (i.e., override circuits 1B, 2B, 3B, . . . 16B) will output a high to force corresponding B side partial products (PP1B, PP2B, . . . PP16B) to zero. Likewise, A side override circuits 34 for rows 17–32 (i.e., override circuits 17A, 18A, . . . 32A) will output a high to force A side partial products (PP17A, PP18A, . . . PP32A) to zero.

In the embodiment of the present invention illustrated in FIG. 3, there is an override circuit 34 connected to each mux 30. However, it is not necessary to provide an override circuit 34 for each mux 30. For example, with reference to FIG. 5, it can be seen that A side mux's for rows 1–16 and B side mux's for rows 17–32 do not need override circuits because the corresponding partial products are not forced to zero (see FIG. 5). Moreover, instead of using a separate override circuit 34 for each mux 30, the plurality of override circuits 34 can be replaced with a single override circuit that generates the different override control signals for each mux 30. Alternatively, there may be several override circuits, where each override circuit controls a plurality of mux's (e.g., each circuit 34 controls 8 mux's).

Figure 6:
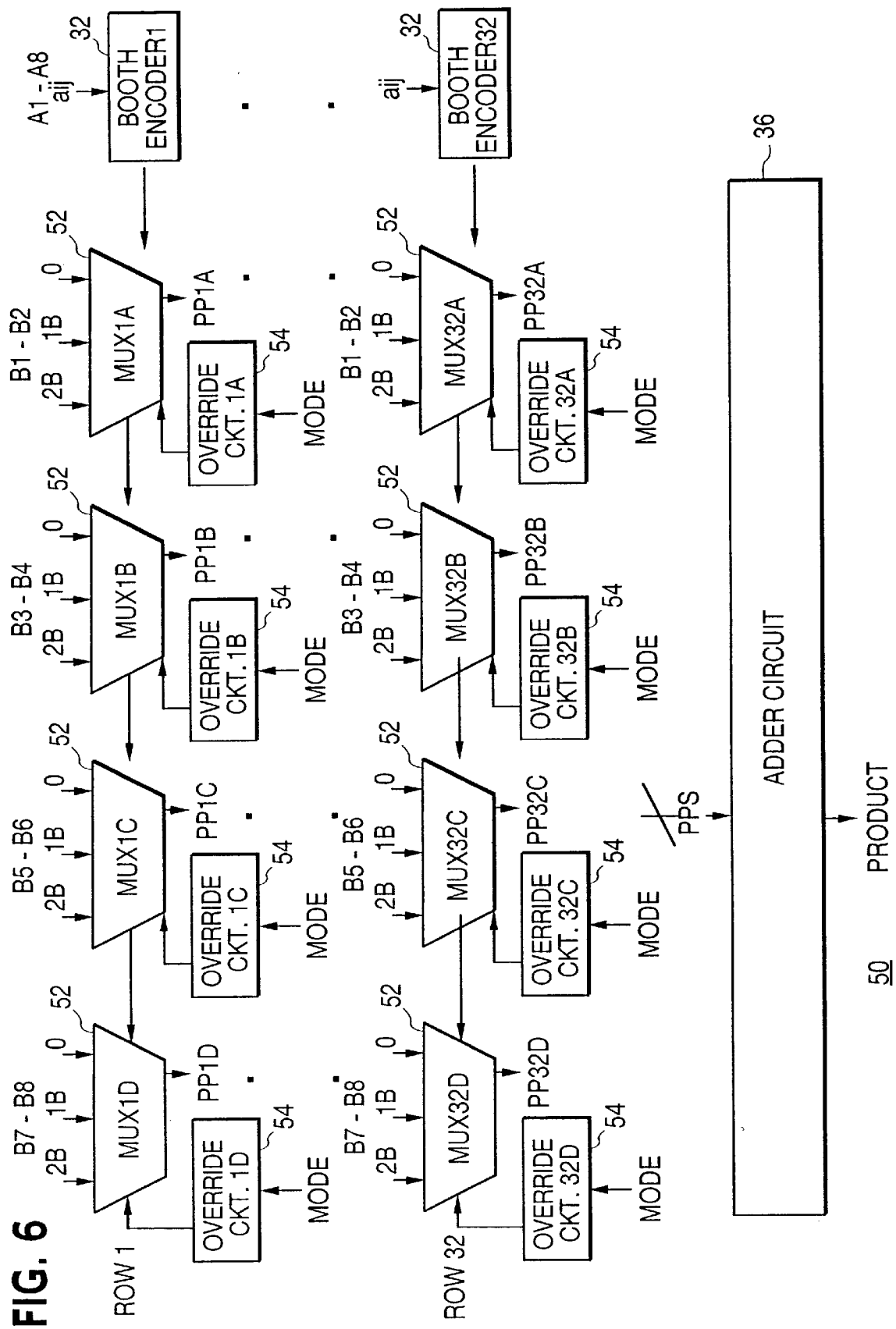
FIG. 6 is a block diagram of a multiplication circuit according to another embodiment of the present invention.

FIG. 6 is a block diagram of a multiplication circuit 50 according to another embodiment of the present invention. According to an embodiment of the present invention, multiplication circuit 50 can perform a single 64-bit multiplication (64-bit mode), two 32-bit multiplications (32-bit mode), or four 16-bit multiplications (16-bit mode). To allow four 16-bit multiplications to be performed by the 64-bit multiplication circuit 50, each row (row 1, row 2, . . . row 32) of mux's is partitioned into four mux's 52, including an A mux, a B mux, a C mux and a D mux (e.g., mux1A, mux1B, mux1C and mux1D for row 1) to provide for greater control of the mux's and partial products (finer 20 granularity). An override circuit 54 is connected to each mux 52 to eliminate unwanted cross-products during 16-bit mode and 32-bit mode. An adder circuit 36 is connected to the outputs of each mux 52 for adding the partial products to generate the final product(s).

Each mux 52 receives two bytes (a multiplicand) of the eight byte value B (wide multiplicand) as the 1B input to the mux 52 and outputs a 16-bit partial product. The A mux's (e.g., mux1A, mux 2A, . . . mux 32A) each receive bytes $B_5$–$B_2$ of the eight byte value B as the 1B input. The B mux's (mux 1B, mux2B . . . mux 32B) receive bytes $B_3$–$B_4$ as 1B inputs. The C mux's receive bytes $B_5$–$B_{6\,as}$ 1B inputs, and the D mux's receive bytes $B_7$–$B_8$ as 1B inputs. Therefore, bytes $B_1$–$B_2$ is the multiplicand for a first multiplication, bytes $B_3$–$B_4$ is the multiplicand for a second multiplication, bytes $B_5$–$B_6$ is the multiplicand for a third multiplication and bytes $B_7$–$B_8$ is the multiplicand for a fourth multiplication. Similarly, bytes $A_1$–$A_2$, $A_3$–$A_4$, $A_5$–$A_6$ and $A_7$–$A_8$ are the multipliers for each of the four multiplications, respectively. The bytes $A_1$–$A_2$ includes the two-bit quantities $a_{11}$–$a_{24}$, the bytes $A_3$–$A_4$ include the two-bit quantities $a_{31}$–$a_{44}$, the bytes $A_5$–$A_6$ include the two-bit quantities $a_{51}$–$a_{64}$ and the bytes $A_7$–$A_8$ include the two-bit quantities $a_{71}$–$a_{84}$. Multiplication circuit 50 will perform these four 16-bit multiplications in parallel.

When a mux 52 is in normal operation (e.g., not forced to select a zero output), each mux 52 selects an appropriate multiple of the 1B input to be output as a 16-bit partial product based on the Booth encoded value received via line 33 from the corresponding Booth encoder 32. For example, mux1A selects a multiple (e.g., 1, 2, −1, −2, 0) of its 1B input ($B_1$–$B_2$) to be the partial product output (PP1A) based on the Booth encoded value received over line 33 from Booth encoder1. Mux's 1B, 1C and 1D similarly select a multiple of their respective 1B inputs based on the Booth encoded value from Booth encoder1. As shown in FIG. 6, other mux's 52 operate in a similar fashion.

An override circuit 54 is connected to each mux 52. Each override circuit 54 receives a mode input indicating whether the multiplication circuit 50 is operating in 64-bit mode, 32-bit mode or 16-bit mode. For example, two bits can be used for the mode input. Based on the mode input (indicating either 16-bit, 32-bit or 64-bit mode) and the location of each corresponding mux (e.g., which row 1–32 and which section A, B, C or D), each override circuit 54 outputs an override control signal to a mux 52 to instruct mux 52 to operate normally (e.g., select an appropriate multiple of its multiplicand input to be output as a partial product based on the Booth encoded value) or to force the mux 52 to output a zero as the partial product to eliminate unwanted cross-products (even though the Booth encoded value may indicate a multiple other than zero). In 64-bit mode, none of the mux's are forced to output zeros as partial products because there are no unwanted cross-products (only a single multiplication is being performed). However, in 16-bit or 32-bit mode, selected mux's must be forced to output zeros.

Figure 7:
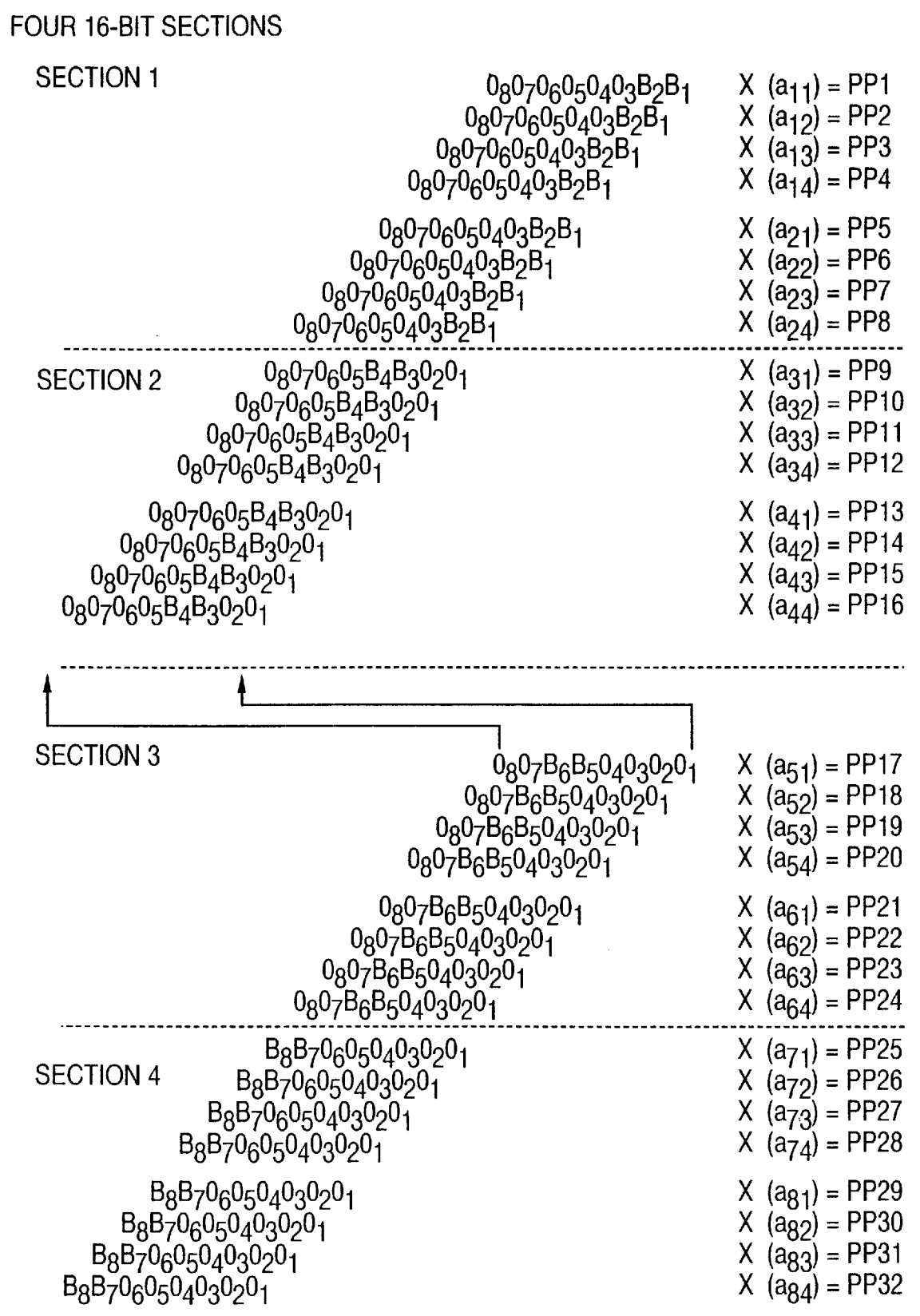

FIG. 7 illustrates a partial product tree for the multiplication circuit 50 of FIG. 6 while operating in 16-bit mode (e.g. performing four 16-bit multiplications in parallel). The partial product tree in FIG. 7 is divided into four sections: section 1 (PP1–PP8), section 2 (PP9–PP16), section 3 (PP17–PP24) and section 4 (PP25–PP32). While operating in 16-bit mode, in section 1, partial products PP1–PP8 are generated by the mux's 52 of rows 1–8 and added to obtain the final product for the first multiplication. In section 2, partial products PP9–PP16 are generated by the mux's 52 of rows 9–16 and added together to obtain the final product for the second multiplication. In section 3, partial products PP17–PP24 are generated by the mux's of rows 17–24 and added together to obtain the final product for the third multiplication. And, in section 4, partial products PP25–PP32 are generated and added together to obtain the product for the fourth multiplication.

Referring to FIGS. 6 and 7, in section 1 of FIG. 7 (corresponding to mux's of rows 1–8), the A mux's (mux1A, mux 2A, . . . mux 8A) are instructed by override circuits 54 to operate normally and output a partial product based on the Booth encoded values and the multiplicand input $B_1$–$B_2$. However, in section 1, the B, C and D mux's (e.g., mux's 1B, 1C, 1D, 2B, 2C, 2D, . . . 8D) are instructed by the corresponding override circuits 54 to each output a zero, as indicated in FIG. 7. As a result, in section 1, partial products PP1–PP8 correspond to PP1A–PP8A, respectively because the B, C and D partial products are zeroed out by override circuits 54.

In section 2 (corresponding to mux's of rows 9–16), the B mux's (mux9B, mux 10B, . . . mux16B) operate normally to generate partial products based on the Booth encoding values and the multiplicand input B3–B4, while the A, C and D mux's are forced by override circuits 54 to output zeros for partial products. In section 3 (corresponding to mux's of rows 17–24), the C mux's (mux 17C, 18C, . . . 24C) operate normally while the A, B and D mux's are forced to output zeros. In section 4, (corresponding to mux's of rows 25–32), the D mux's (mux 25D, 26C, . . . 32D) operate normally while the A, B and C mux's are forced to output zeros. In this manner, the 64-bit multiplication circuit 50 can perform four 16-bit multiplications in parallel without generating erroneous cross-products.

In a similar manner, multiplication circuit 50 can perform two 32-bit multiplications in parallel while in 32-bit mode. In the 32-bit mode, the mux's 52 are controlled by override circuits 54 to generate the partial product tree illustrated in FIG. 5. The 1B inputs (B1–B2, B3–B4, B5–B6 or B7–B8) to each mux 52 remain the same regardless whether the multiplication circuit 50 is in 16-bit mode, 32-bit mode or 64-bit mode. The only change is that different mux's 52 will be forced to output zeros while in different modes (none of the mux's 52 are instructed to output zeros while in 64-bit mode). When in 32-bit mode, the C and D mux's for rows 1–16 (mux's 1C, 1D, 2C, 2D, . . . 16D) are instructed to output zeros, while the A and B mux's for rows 17–32 (mux's 17A, 17B, 18A, 18B . . . 32B) are instructed to output zeros. In 32 bit mode, two 16-bit partial products are concatenated together to generate each 32-bit partial product. Thus, by using each 16-bit partial product separately or by concatenating multiple 16-bit partial products together to obtain wider partial products, the present invention generates variable width partial products depending on the mode of operation.

While, in the 64-bit multiplication circuit 50 of FIG. 6, each partial product selector row is partitioned into four mux's (mux A, B, C and D) to allow circuit 50 to perform four 16-bit multiplications in parallel (or two 32-bit multiplications or a single 64-bit multiplication), each partial product selector row can be partitioned into any number of mux's to provide sufficient partial product granularity to accommodate a wide range of sizes for the operands. For example, each mux row can be partitioned into eight mux's, wherein each mux outputs an 8-bit partial product. According to an embodiment of the present invention, such a configuration provides a multiplication circuit that can perform a single 64-bit multiplication, two 32-bit multiplications, four 16-bit multiplications or eight 8-bit multiplications. Thus, the present invention provides a multiplication circuit that can efficiently handle operands of different sizes.

The multiplication circuits 25 and 50 (of FIG. 3 and 6) provide a minimum area and time impact to allow the multiplication circuit to perform a single instruction multiplication on single or multiple data (e.g., 16-bit, 32-bit or 64-bit multiplications). Flexibility is provided in the multiplication circuits by partitioning each partial product selector row into a plurality of separately controllable mux's, with each mux connected to an override circuit. However, as described below, additional control over the partial products can be obtained by adding additional Booth encoders to each row to enable the multiplication circuit to perform even more multiplications in parallel.

Figure 8:
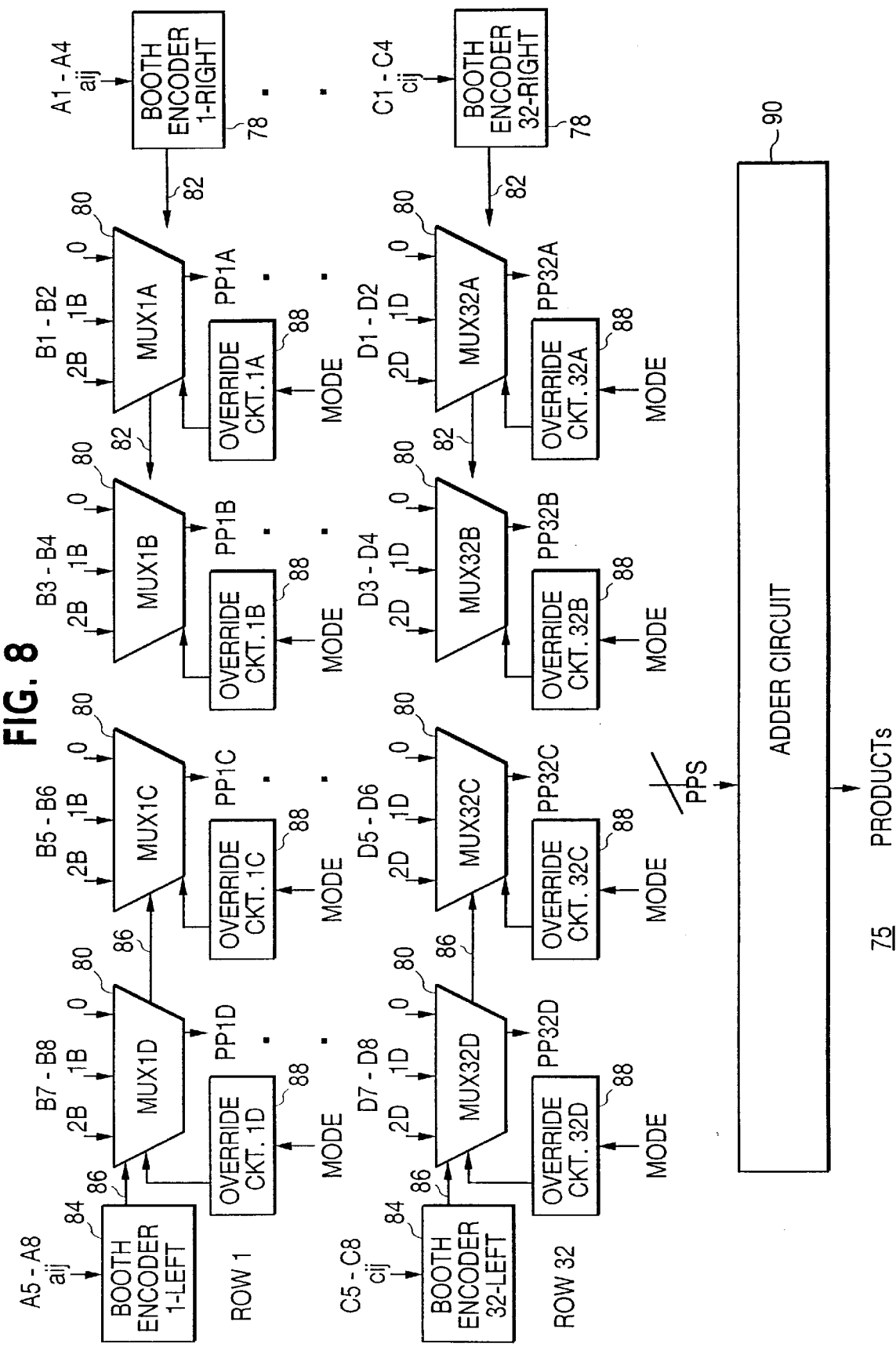
FIG. 8 is a block diagram of a multiplication circuit according to yet another embodiment of the present invention.

FIG. 8 is a block diagram of a multiplication circuit 75 according to yet another embodiment of the present invention. According to an embodiment of the present invention, multiplication circuit 75 can perform a single 64-bit multiplication (64-bit mode), two 32-bit multiplications (32-bit mode), or eight 16-bit multiplications (16-bit mode).

(Multiplier 75 can also perform 4 24-bit multiplications if the width is extended from 64 bits to 72 bits). Each partial product selector row is partitioned into four mux's 80 (mux's A, B, C and D for each row). An override circuit 88 is connected to each mux 80 to eliminate (or force to zero) unwanted cross-products during modes other than the 64-bit mode (single multiplication). An adder circuit 90 is connected to the outputs of each mux 80 for adding the partial products to generate the final product for each multiplication.

The multiplication circuit 75 receives a first 64-bit multiplier A (bytes $A_1$–$A_8$), a first 64-bit multiplicand B (bytes $B_1$–$B_8$), a second 64-bit multiplier C (bytes $C_1$–$C_8$) and a second 64-bit multiplicand D (bytes $D_1$–$D_8$). A right Booth encoder 78 and a left Booth encoder 84 are provided for each partial product selector row to provide additional control over the partial products.

FIG. 8 illustrates the multiplicand inputs into the mux's and the multiplier inputs into the Booth encoders only for the 16-bit mode. The inputs into the mux's and Booth encoders will be slightly different in other modes, described below. In 16-bit mode (performing eight 16-bit multiplications), the right Booth encoders 78 for the first 16 rows (Booth encoders 1-right, 2-right, . . . 16-right) Booth encode the two bit quantities $a_{ij}$ of the four least significant bytes ($A_1$–$A_4$) of A, and the left Booth encoders 84 for the first 16 rows (Booth encoders 1-left, 2-left, . . . 16-left) Booth encode the two bit quantities aij of the four most significant bytes $A_5$–$A_8$. Likewise, right Booth encoders 78 for rows 17–32 (Booth encoders 17-right, 18-right, . . . 32-right) Booth encode the two bit quantities $c_{ij}$ of the four least significant bytes ($C_1$–$C_4$) of the value (second multiplier) C, and the left Booth encoders 84 for rows 17–32 (Booth encoders 17-left, 18-left, . . . 32-left) Booth encode two bit quantities cij of the four most significant bytes $C_5$–$C_8$ of C. The right Booth encoders 78 output Booth encoded values via lines 82 only to A and B mux's in the row. Whereas, the left Booth encoders 84 output Booth encoded values via lines 86 only to the C and D mux's of the row.

The A, B, C and D mux's for rows 1–16 receive bytes $B_1$–$B_2$, $B_3$–$B_4$, $B_5$–$B_6$ and $B_7$–$B_8$, respectively, as the 1B (multiplicand) inputs (for multiplications 1–4). Whereas, the A, B, C and D mux's for rows 17–32 receive bytes $D_1$–$D_2$, $D_3$–$D_4$, $D_5$–$D_6$ and $D_7$–$D_8$, respectively, as the 1D (multiplicand) inputs (for multiplications 5–8).

FIG. 9 illustrates a partial product tree for the multiplication circuit 75 illustrated in FIG. 8 while operating in 16-bit mode (performing eight 16-bit multiplications). The partial product tree is divided into four sections (sections 1–4), wherein each section is separated by a dashed line. In each section, the Booth encoded values generated by the left and right Booth encoders and the corresponding partial products (PP) are shown on the left and right sides of the partial product tree, respectively. Each section generates eight partial products on the right for a first multiplication, and eight partial products on the left for a second multiplication. With four sections, this provides eight partial products for each of eight separate 16-bit multiplications. For each partial product (PP) in FIG. 9, the first subscripted number identifies the multiplication and the second number identifies the partial product number for that particular multiplication. For example, $PP_{3-8}$ identifies the eighth (last) partial product for the third multiplication. Partial products $PP_{1-1}$ through $PP_{1-8}$ illustrated on the right of section 1 are partial products for a first multiplication and are based on Booth encoded quantities $a_{ij}$ for bytes $A_1$–$A_2$ and multiplicand bytes $B_1$–$B_2$. In section 1 on the right side, the partial products generated from multiplicand input bytes B3–B4 for rows 1–8 are forced to zero (i.e., outputs from mux's 1B, 2B, 3B, . . . 8B are forced to zero by corresponding override circuits 88 to eliminate unwanted cross-products for the first multiplication). Because A and B mux's are connected only to right side Booth encoders 78, and C and D mux's are connected only to left Booth encoders 84, partial products for the first multiplication receive contribution only from A mux's and B mux's (e.g., mux 1A, 1B, 2A, 2B, . . . 8A, 8B) for rows 1–8, and contribution is not received from C and D mux's. However, the B mux's are forced to zero for the first multiplication (rows 1–8) by override circuits 88.

Likewise, partial products $PP_{2-1}$ through $PP_{2-8}$ illustrated on the left side of section 1 are partial products for a second multiplication and are based on Booth encoded quantities $a_{ij}$ for bytes $A_5$–$A_8$ and multiplicand bytes $B_5$–$B_6$. In section 1 on the left side, the partial products generated from multiplicand input bytes $B_7$–$B_8$ for rows 1–8 are forced to zero (i.e., outputs of mux's 1D, 2D, 3D, . . . . 8D are forced to zero) by corresponding override circuits 88 (FIG. 8).

Similarly, in section 2 (corresponding to rows 9–16), partial products are generated using the right Booth encoder 78 and the left booth encoder 84 in each row based on two-bit quantities $a_{ij}$ of the multiplier A and bytes of the multiplicand B. In section 2 (rows 9–16) on the right side, the partial products generated from multiplicand input bytes $B_1$–$B_2$ are forced to zero (i.e., outputs of mux's 9A, 10A, . . . 16A are forced to zero) for the third multiplication. In section 2 (rows 9–16) on the left side, the partial products generated from multiplicand input bytes $B_5$–$B_6$ are forced to zero (i.e., outputs of mux's 9C, 10C, . . . 16C are forced to zero) for the fourth multiplication In sections 3–4 (corresponding to rows 17–32), eight partial products are generated for each of the remaining four multiplications (multiplications 5–8) based on the two bit quantities $c_{ij}$ of the multiplier C and bytes of multiplier D in a manner that is similar to sections 1–4. The eight partial products for each multiplication are added separately by adder circuit 90 to obtain the final product for each multiplication.

When multiplication circuit is in 32-bit mode (to perform two 32-bit multiplications), multiplier bytes A1–A4 are Booth encoded on the right side of rows 1–32, with multiplier bytes A5–A8 Booth encoded on the left side of rows 1–32. In 64-bit mode, multiplier A1–A8 is Booth encoded in rows 1–32 on both the right side and the left side Booth encoders. Multiplicand B is input to the mux's of each of the 32 rows. In this manner, the multiplication circuit 75 can efficiently handle one 64-bit multiplication, two 32-bit multiplications, or eight 16-bit multiplications.

The present invention is not limited to the sizes and configurations of multiplication circuits set forth herein. The embodiments described herein are provided simply as examples to explain the principles of the present invention. According to the present invention, the multiplication circuits and partial product trees can have a wide variety of sizes and configurations.

For example, each partial product row can be partitioned into, for example, eight mux's, with each mux receiving one of eight bytes of a multiplicand as the 1B input. An override circuit can also be connected to each mux. In 8-bit mode, for example, in rows 1–4, bytes B1 (first mux in the row) and B5 (the fifth mux in the row) contribute to the partial products, with the remaining mux's in the rows forced to output zeros. In rows 5–8, mux's for bytes B2 and B6 contribute to the partial products, with other mux's (partial products forced to zero. In rows 9–12, mux's for bytes B3 and B7 contribute to the partial products, while in rows 13–16, mux's for bytes B4 and B8 contribute to partial products. This provides partial products for eight multiplications (four multiplications per side) in the top half of the partial product tree in 8-bit mode. The lower half of the multiplication circuit and partial product tree is configured in a similar manner, except the eight byte multiplier C is used, and the eight byte multiplicand D is used (one byte of D is input into each of the eight mux's per row for rows 17–32). This configuration allows one 64-bit, two 32-bit, eight 16-bit or sixteen 8-bit multiplications, etc. to be efficiently performed using the same 64-bit multiplication circuit.

Figure 1:
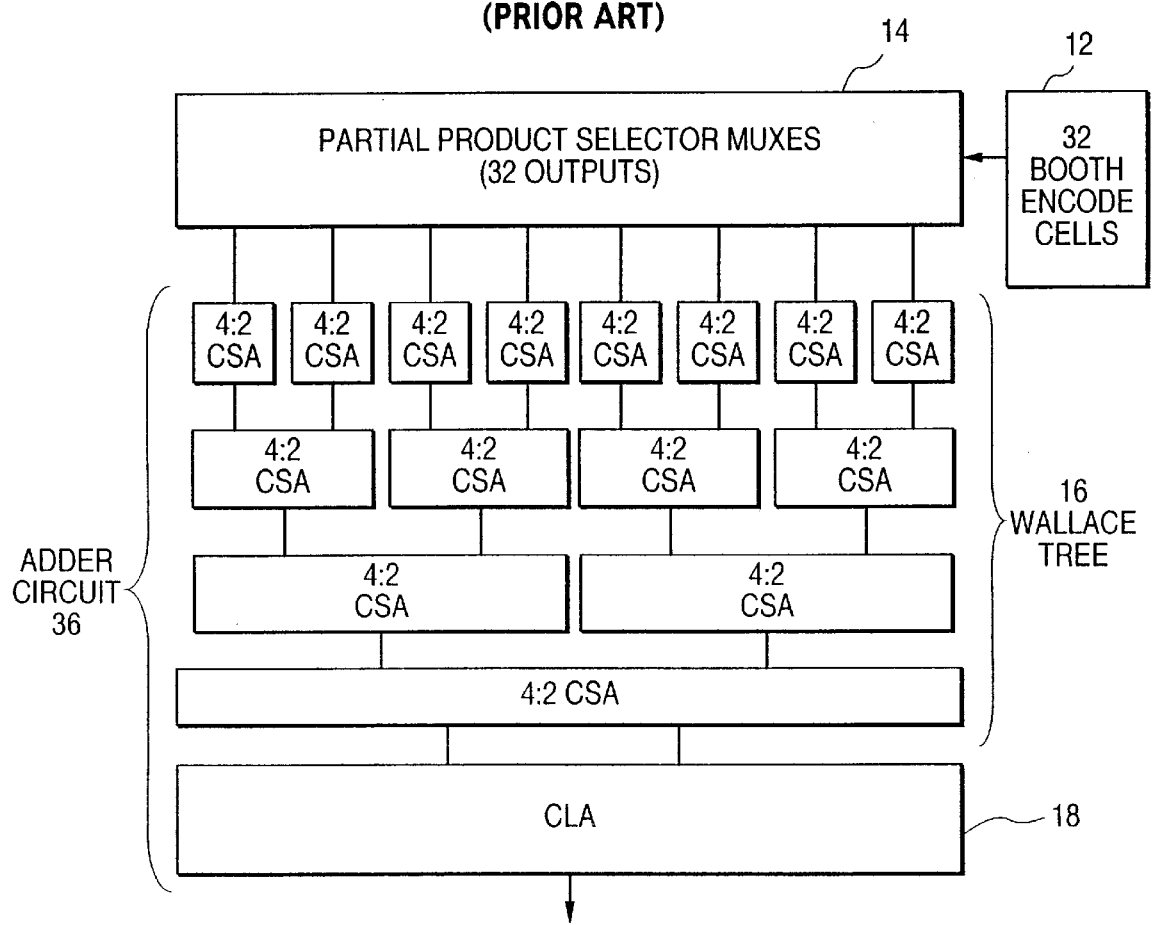
FIG. 1 illustrates an example of a traditional approach to multiplication using Booth's algorithm.
Figure 2:
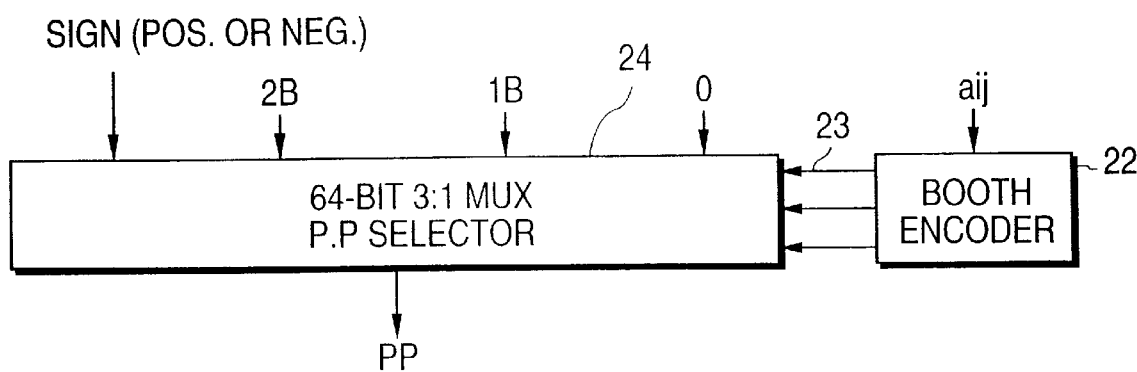
FIG. 2 illustrates a Booth encoder and a partial product selector (mux) for the multiplication circuit of FIG. 1.
Figure 10:
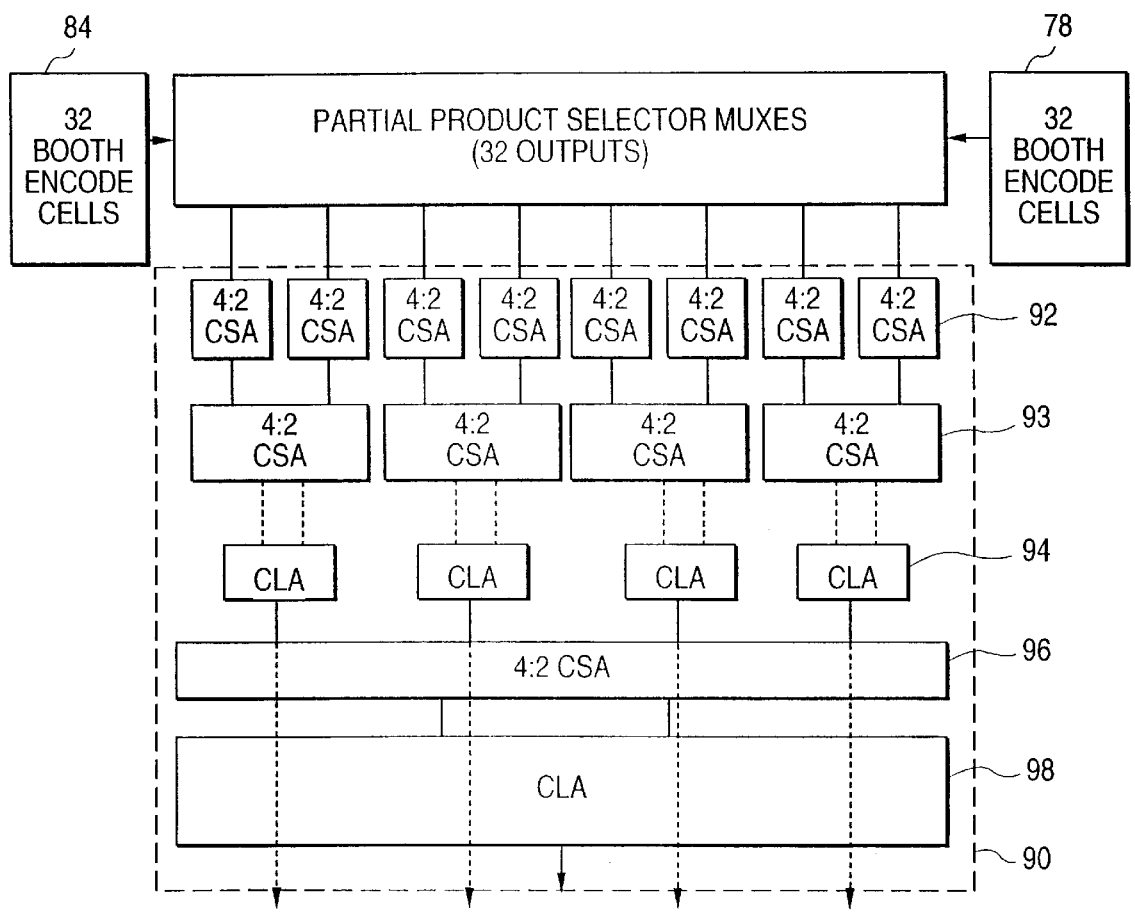
FIG. 10 is a block diagram of the multiplication circuit of FIG. 8 illustrating some of the details of the adder circuit according to an embodiment of the present invention.

FIG. 10 is a block diagram of the multiplication circuit 75 of FIG. 8 illustrating the details of the adder circuit 90 according to an embodiment of the present invention. It is important to keep the additions of the partial products separate for the separate multiplications when using multiple Booth encoders on each partial product selector row (e.g., left and right Booth encoders). The adder circuit 90 includes a row 92 of eight 4:2 carry save adders (CSAs), followed by a row 93 of four 4:2 CSAs, followed by a row 94 of four carry look-ahead adders (CSAs), followed by a 4:2 CSA 96, and finally followed by a CLA 98. As compared to the adder circuit 36 illustrated in FIG. 1, the row 94 of four CLAs in FIG. 10 replaces a row of two CSAs in FIG. 1. The row 94 of CLAs is provided to keep the additions of the eight 16-bit multiplications separate.

Currently, a wide multiplication circuit that can perform a single wide operation can also perform only one smaller width operation. According to an embodiment of the present invention, a multiplication circuit is provided that can perform a single wide operation and also perform multiples of the same operation on smaller data width operands, depending on the mode of operation. The multiplication circuit according to an embodiment of the present invention includes a plurality of partial product selector rows. Each partial product selector row is partitioned into a plurality of mux's. Each mux receives at least a portion of a wide multiplicand. A Booth encoder is coupled to each row of mux's for Booth encoding a portion of a multiplier. An override circuit is connected to one or more of the mux's for selectively controlling some of the mux's to output a zero as a partial product based on the mode of operation. According to another embodiment of the present invention, multiple Booth encoders are provided on each row.

What is claimed is:

1. A circuit for generating partial products for variable width multiplication operations, said circuit comprising:
    a plurality of partial product selector groups, each partial product selector group including a plurality of partial product selector circuits, each partial product selector circuit receiving a portion of a multiplicand as an input and outputting a partial product;
    a plurality of Booth encoders, at least one of the Booth encoders coupled to each partial product selector group, each Booth encoder receiving as an input a portion of a wide multiplier and outputting a Booth encoded value to at least a portion of a partial product selector group;
    a control circuit coupled to one or more of the partial product selector circuits, said control circuit operable to control one or more of said partial product selector circuits to output a zero depending on a mode of operation.

2. The circuit of claim 1 wherein a plurality of said partial products are combined to obtain a partial product in a single wide mode of operation.

3. A multiplication circuit for performing a single wide multiplication or multiples of the multiplication operation in parallel on smaller operands depending on a mode of operation, comprising:
    a plurality of partial product selector groups, each partial product selector group including a plurality of partial product selector circuits, each partial product selector circuit receiving a portion of a multiplicand as an input and outputting a partial product;
    a plurality of Booth encoders, at least one of the Booth encoders coupled to each partial product selector group, each Booth encoder receiving as an input a portion of a multiplier and outputting a Booth encoded value to at least a portion of a partial product selector group;
    an override circuit coupled to one or more of the partial product selector circuits, said override circuit operable to control one or more of said partial product selector circuits to output a zero depending on a mode of operation of said multiplication circuit; and
    an adder circuit coupled to outputs of the partial product selector circuits.

4. The multiplication circuit of claim 3 wherein each said partial product selector circuit comprises a multiplexer (mux).

5. The multiplication circuit of claim 3 wherein said override circuit comprises a plurality of override circuits, each override circuit being connected to on of said partial product selector circuits.

6. The multiplication circuit of claim 3 wherein each partial product selector group comprises a partial product selector row.

7. The multiplication circuit of claim 3 wherein said mode of operation indicates that the multiplication circuit is performing a single wide multiplication operation or multiples of the multiplication operation on smaller operands.

8. The multiplication circuit of claim 3 wherein each partial product selector circuit within each said partial product selector group receives a different portion of a wide multiplicand as an input.

9. The multiplication circuit of claim 3 wherein corresponding partial product selector circuits in each group receive a same portion of a wide multiplicand as an input.

10. The multiplication circuit of claim 7 wherein each said portion of the wide multiplicand represents either a portion of a single wide multiplicand in a first mode of operation or a multiplicand for one of a plurality of smaller multiplications in a second mode.

11. The multiplication circuit of claim 3 wherein each said partial product selector circuit in one of said groups receives a Booth encoded value from the same Booth encoder.

12. The multiplication circuit of claim 10 wherein said override circuit controls selected partial product selector circuits to output a zero in the second mode of operation.

13. A circuit for generating wide partial products for performing a single wide multiplication in a first mode of operation or for generating smaller partial products for performing multiple smaller multiplications in parallel in a second mode of operation, said circuit comprising:
    a plurality of partial product selector rows, each partial product selector row including two partial product selector circuits, each partial product selector circuit receiving half of a wide multiplicand as an input and outputting a small partial product, two small partial products being combined to generate a wide partial product in the first mode;

a Booth encoder coupled to each partial product selector row, each Booth encoder receiving as an input a portion of a wide multiplier and outputting a Booth encoded value to one of the partial product selector rows;

an override circuit coupled to a plurality of the partial product selector circuits, said override circuit operable to control selected partial product selector circuits to output a zero as a partial product in said second mode.

14. A method of performing either a single wide multiplication in a first mode of operation or performing multiple smaller multiplications in parallel in a second mode of operation, said method comprising the steps of:

receiving a first number A and a second number B;

Booth encoding portions of the first number A to generate Booth encoded values;

generating a plurality of small partial products, each said small partial product being generated as a multiple of a portion of the second number B based on one of the Booth encoded values;

in said second mode of operation, generating a zero for selected ones of said small partial products regardless of the Booth encoded value to allow a plurality of small multiplications to be performed in parallel;

adding together a plurality of said small partial products to generate one or more products.

15. The method of claim 14 wherein said step of adding together comprises the steps of:

in said first mode of operation, combining a plurality of small partial products to generate wide partial products, and adding together said wide partial products to generate for said wide multiplication in said first mode of operation; and in said second mode of operation, adding together a plurality of small partial products to generate a product for each said small multiplication.

16. The method of claim 15 wherein said step of combining comprises the step of concatenating a plurality of small partial products to generate wide partial products.

17. A circuit for generating partial products for variable width multiplication operations, said circuit comprising:

a plurality of partial product selector groups, each partial product selector group including a plurality of partial product selector circuits, each partial product selector circuit receiving a portion of a multiplicand as an input and outputting a partial product;

a plurality of Booth encoders, at least two of the Booth encoders coupled to each partial product selector group, each Booth encoder receiving as an input a portion of a wide multiplier and outputting a Booth encoded value to at least a portion of a partial product selector group, the plurality of Booth encoders coupled to each said partial product selector group receiving as an input a different portion of the wide multiplier;

a control circuit coupled to one or more of the partial product selector circuits, said control circuit operable to control one or more of said partial product selector circuits to output a zero depending on a mode of operation.

18. The circuit of claim 17 wherein said plurality of partial product selector groups comprises a plurality of partial product selector rows.

19. The circuit of claim 18 wherein said plurality of Booth encoders comprises a left and right Booth encoders coupled to each partial product selector row.

* * * * *